United States Patent [19]

Schäpel et al.

[11] 4,029,593

[45] June 14, 1977

[54] MIXED POLYOLS

[75] Inventors: Dietmar Schäpel, Cologne; Ulrich von Gizycki, Opladen, both of Germany

[73] Assignee: Bayer Aktiengesellschaft, Leverkusen, Germany

[22] Filed: Aug. 12, 1974

[21] Appl. No.: 496,617

[30] Foreign Application Priority Data

Aug. 16, 1973 Germany .......................... 2341294

[52] U.S. Cl. .................. 252/182; 260/2.5 AM; 260/2.5 AP; 260/2.5 AQ
[51] Int. Cl.$^2$ ............................... C09K 3/00
[58] Field of Search ............. 252/182; 260/2.5 AP, 260/2.5 AM, 77.5 AP, 2.5 AK

[56] References Cited

UNITED STATES PATENTS

| | | | |
|---|---|---|---|
| 3,558,529 | 1/1971 | Whitman et al. | 260/2.5 AP |
| 3,625,872 | 12/1971 | Ashida | 260/2.5 AK |
| 3,630,973 | 12/1971 | Ardis et al. | 260/2.5 AM X |
| 3,640,920 | 2/1972 | Cear | 260/2.5 AK |
| 3,945,939 | 3/1976 | Barron | 252/182 |

Primary Examiner—Leland A. Sebastian
Attorney, Agent, or Firm—Gene Harsh; Joseph C. Gil; William E. Parry

[57] ABSTRACT

Mixtures of polyols which normally separate into phases are stabilizeed against such separation by including in the mixture a stabilizing amount, preferably from about 0.05% to about 5% based on the weight of polyols in the mixture of an inert surface-active inorganic material having a specific surface of about 10 to about 800 m$^2$/g.

6 Claims, No Drawings

MIXED POLYOLS

This invention relates to organic polyhydroxy compounds and more particularly to a method for improving the compatability or miscibility of two or more polyols with each other and to a polyol mixture for use in making foam resins by reaction with organic polyisocyanates.

It is known from German Offenlegungsschrift No. 1,770,703 to use mixtures of polyols which are incompatible with each other for the preparation of polyurethanes. In this way, it is possible to obtain end products which have improved properties, for example, greater heat resistance and higher impact strength.

According to an earlier proposal of the present applicants (German Patent Application No. P 23 09 861.5), this principle of using mixtures of polyols which are incompatible with each other for preparing polyurethanes can also be applied to the production of molded foam plastic products which have a compact or dense surface.

The use of a mixture of incompatible polyols has, however, numerous disadvantages regarding storage and methods of processing the products.

When polyol systems of this kind which have been thoroughly mixed are stored for even a relatively short time, i.e. several hours to three days, the mixture separates into two phases so that it must be very vigorously mixed again each time before use in order to insure that the individual components in the mixture will be uniformly distributed through the mixture in the correct proportions.

Furthermore, the polyurethane processing machines which are commonly used in practice because they are so simple in construction and easy to operate and which are equipped with a two-component mixing head cannot be used for mixing the heretofore available polyol mixture with the isocyanate component because, due to the tendency of mixed polyol systems based on incompatible polyols to separate into their components, it is imposible to insure that the polyol components will be delivered to the mixing head in the correct proportions which is absolutely essential for the satisfactory production of polyurethanes.

It is also known to add inorganic material such as barium sulphate, kieselguhr, carbon black, silicates, titanium dioxide, kaolin, antimony trioxide or carborundum to the polyol mixtures which are used for the production of polyurethanes. The inorganic constituents are used for various purposes, e.g. as flame-retarding agents, abrasives, fillers or reinforcing substances. The inorganic additives are used for these purposes in quantities of between about 5 and 500 parts by weight, based on 100 parts by weight of polyol mixture.

It is an object of this invention to provide mixtures of polyols stabilized against separation into a plurality of phases. Another object of the invention is to provide a method for stabilizing a mixture of polyols which are incompatible in the sense that they separate, at least partially, into phases in storage against such separation. A further object of the invention is to provide mixtures of polyols which are normally at least partially incompatible which have been stabilized against separation into phases.

The foregoing objects and others are accomplished in accordance with this invention, generally speaking, by providing polyol mixtures containing a. at least two polyols (1) and (2) which are normally at least partially incompatible or immiscible with each other b. a stabilizing amount, preferably about 0.05 to about 5 percent by weight, based on component a, of an inert surface-active inorganic material having a specific surface of about 10 to about 800 m²/g and, c. optionally, auxiliary agents and additives of the kind commonly used for producing polyurethanes.

It has now surprisingly been found that rapid settling or separation of one or more of the components in a mixture of incompatible polyols, and optionally, the additives commonly used in polyurethane chemistry can to a large extent, be prevented by adding small quantities of certain inorganic materials.

Component a) of the mixture according to the invention comprises an incompatible or only partly compatible combination of two or more organic polyhydroxyl compounds which are known per se in polyurethane chemistry. These combinations are peferably binary system of 1. one or more low-molecular weight polyols with hydroxyl numbers in the range of about 800 to about 1800 and,
2. one or more higher-molecular weight polyols with hydroxyl numbers in the range of about 28 to about 84.

Incompatible or partly compatible means, in the context of this invention, that at least 1% and usually at least 5% of the polyol combination separates after 12 hours' storage at room temperature if it does not contain any additives according to the invention, the said percentages being measures of the parts by volume, based on the original total mixture, which separate in the form of a visible layer from the total quantity.

The ratios by weight of low-molecular weight polyol to higher molecular weight polyol in polyol mixture (a) are preferably between 60:40 and 10:90, preferably between 50:50 and 20:80.

Any suitable low-molecular weight organic polyol may be used for component (1) but preferred organic compounds are those having a molecular weight of about 62 to about 500 and represented by the general formula

$$R(OH)_n$$

in which $n$ represents an integer of from 2 to 10, preferably 2 to 4 and R represents an N-valent aliphatic hydrocarbon group containing 2 to 8 carbon atoms, a cycloaliphatic hydrocarbon group containing 5 to 10 carbon atoms or an araliphatic hydrocarbon group containing 8 to 10 carbon atoms; the group R may also contain hetero atoms, in particular oxygen, in the form of ether, ester and glycoside groups.

Examples of suitable low molecular weight polyols (1) are ethylene glycol, propane-1,2-propane-1,3-diol, butane-1,4-diol, butane-1,2-diol, pentane-1,2-diol, pentane-1,5-diol, hexane-1,2-diol, hexane-1,6-diol, glycerol, trimethylol propane, pentaerythritol, sorbitor, sucrose, α-methyl glycoside, diethylene glycol, dipropylene glycol, 1,4-dimethylol-cyclohexane, 1,4-dihydroxy-cyclohexane, hexane-1,2,6-triol, 1,4-dimethylol benzene, low molecular weight addition products of ethylene oxide and/or propylene oxide with such polyols or also low-molecular weight polyhydroxy polyesters, e.g. the esterification product of 1 mol of oxalic acid and 2 mols of ethylene glycol and the like.

Any suitable organic compound having at least two hydroxyl groups may be used as component (2). Preferred higher molecular weight polyols (2) are hydroxyl terminated polyesters, -polyethers, -polythioethers, -polyacetals, -polycarbonates and -polyesteramides, known per se in polyurethane chemistry which have molecular weights within the range of about 1000 to 6000, preferably about 1300 to about 4800 and a hydroxyl number within the range of about 28 to about 84. Suitable polyesters which contain hydroxyl groups are, for example, the reaction products of polyvalent preferably divalent alcohols with the optional addition of trivalent alcohols and polybasic, preferably dibasic carboxylic acids. Instead of the free polycarboxylic acids, the corresponding polycarboxylic acid anhydrides or corresponding polycarboxylic acid esters of lower alcohols or of their mixtures may be used for preparing the polyesters. The polycarboxylic acids may be aliphatic, cycloaliphatic, armoatic and/or heterocyclic and may be substituted, e.g. with halogen atoms, and/or unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate and the like. The polyhydric alcohols used may be, for example, the following: ethylene glycol, propylene-1,2- and -1,3- glycol, butylene-1,4- and 2,3-glycol, hexane-1,6-diol, octane-1,8-diol, neopentyl glycol cyclohexane dimethanol (1,4-bis-hydroxymethyl cyclohexane), 2-methyl-propane-1,3-diol, glycerol, trimethylolpropane, hexane-1,2,6-triol, butane-1,2,4-triol, trimethylol ethane, pentaerythritol, quinitol, mannitol and sorbitol, methyl glycoside, diethylene glycol triethylene glycol, tetraethylene glycol, polyethylene glycols, dipropylene glycol, polypropylene glycols, dibutylene glycol, polybutylene glycols and the like. The polyesters may also include a portion with carboxy end groups. Polyesters of lactones such As ε-caprolactone or hydroxycarboxylic acids such as ω-hydroxycaproic acid may also be used.

Any suitable polyether which contains at least two, generally two to eight and preferably two or three hydroxyl groups may be used. Such polyethers are known per se and are prepared e.g. by polymerizing epoxides such as ethylene oxide, propylene oxide, butylene oxide, tetrahydrofuran, styrene oxide or epichlorohydrin, each with itself, e.g. in the presence of boron trifluoride or by the addition of these epoxides, either as mixtures or successively, to starting components which contain reactive hydrogen atoms, such as alcohols or amines, e.g. water, ethylene glycol, propylene-1,3- or -1,2- glycol, trimethylolpropane, 4,4'-dihydroxy diphenyl propane, aniline, ammonia, ethanolamine, or ethylene diamine. Sucrose polyethers, e.g. those described in German Auslegeschriften Nos. 1,176,358 and 1,064,938 may also be used according to the invention. It is frequently preferred to use those polyethers which contain predominantly primary hydroxyl groups (up to 90% by weight, based on all the hydroxyl groups present in the polyether). Polyethers modified with vinyl polymers such as can be obtained, for example, by polymerizing styrene or acrylonitrile in the presence of polyethers (U.S. Pat. Nos. 3,383,351; 3,304,273; 3,523,093; and 3,110,695 and German Patent Specification No. 1,152,536) and polybutadienes which contan hydroxyl groups are also suitable.

Any suitable polythioether may be used such as, for example, the condensation products of thiodiglycol with itself and/or with other glycols, dicarboxylic acids, formaldehyde, aminocarboxylic acids or amino alcohols. The products obtained are polythio mixed ethers, polythioether esters or polythioether ester amides, depending upon the cocomponents.

The polyacetals used may be, for example, the compounds which can be prepared from glycols such as diethylene glycol, triethylene glycol, 4,4'-dioxethoxydiphenyl dimethylemethane, hexanediol and formaledhyde. Polyacetals suitable for the purpose of the invention can also be prepared by polymerizing cyclic acetals.

Suitable polycarbonates which contain hydroxyl groups are known per se, e.g. those obtained by reacting diols such as propane-1,3-diol, butane-1,4-diol and-/or hexane-1,6-diol, diethylene glycol, triethylene glycol or tetraethylene glycol with diarly carbonates such as diphenyl carbonate or with phosgene.

The polyester amides and polyamides include, for example, the predominantly linear condensates obtained from polyvalent saturated and unsaturated carboxylic acids or their anhydrides and polyvalent saturated and unsaturated amino alcohols, diamines, polyamines or mixtures thereof.

The higher-molecular weight polyols used are preferably polyhydroxy poly of the kind mentioned above which are known per se in polyurethane chemistry, which contain 2 to 3 hydroxyl groups per molecule.

The components b) of the mixtures according to the invention are surface-active inorganic substances which are inert in an isocyanate polyaddition reaction and which have a specific surface according to the BET method (S. Brunauer, P. H. Emmett and E. Teller "Adsorption of Gases in Multimolecular Layers" J. American Chem. Soc. 60, 309 (1938) of 10–800 m$^2$/g, preferably 50–200 m$^2$/g.

The polyols contemplated as components (1) and (2) are those disclosed in the polyurethane art including those described by Saunders and Frisch in the book "Polyurethanes: Chemistry and Technology" published by Interscience Publishers. The various auxilliary agents and additive (c) which may be included in the polyol mixtures stablized in accordance with the invention are also disclosed in the Saunders and Frisch book.

Any inorganic material conforming to the above-definition may be used according to the invention in various forms, e.g. as a high-bulk agglomerate or in the form of fibers of either mineral or synthetic origin. Examples are: active charcoals, asbestos, surface-active silicic acid preparations or zeolites. It is preferred to use various kinds of surface-active silicic acid agglomerates, e.g. pyrognic, precipitated or micronized silicic acids, various kinds of chrysotile asbestos which can be obtained by various methods of decomposition known per se, or materials which resemble chrysotile asbestos in their inerological structure. Mixtures of these compounds may also be used.

The mixtures according to the invention may contain component (b) in quantities of 0.05–5 percent by weight, preferably 0.15–3 percent by weight, based on the weight of component (a).

The auxiliary substances and additives (c) which may also be present in the mixtures according to the invention are mainly the stabilizers, activators and/or blowing agents known per se in polyurethane chemistry such as those described, for example, in Kunststoff-Handbuch, Volume VII, Carl-Hanser-Verlag, Munich 1966.

Such stabilizers are e.g. the usual polysiloxane stabilizers known per se which are used for the preparation of polyurethane foams. Such activators are the normal catalysts or polyurethane chemistry such as e.g. organic tin-salts such as dibutyl tin-dilaurate, or organic tertiary amines such as triethylene diamine, permethylated diethylene-triamine, N,N-dimethylbenzylamine etc. Such blowing agents are e.g. water or halogenated hydrocarbons such as difluorodichloromethane, trifluoromonochloromethane, or monoflurortrichloromethane.

The addition of components (b) has the effect of very substantially stabilizing the system against separation of the polyols. The time which elapses before the components in the mixture separate is generally increased by 5–60 times by the addition of components (b). The mixtures according to the invention are, as a first approximation, finely divided emulsions which by separation of their components (delayed according to the invention) are converted by way of an intermediate stage of a coarse emulsion into multi-layered and in particular two-layered systems.

The mixtures according to the invention therefore differ advantageously from the mixtures used according to German Offenlegungsschrift No. 1,770,703 be being much more easily processed into polyurethane foams with the aid of the known two-component mixing apparatus. Furthermore, this invention makes it possible for polyol mixtures which are basically imcompatible to be stored for weeks without significant separation into their components.

The preparation of the polyol mixtures according to the invention may be carried out, for example, by mixing the low-molecular weight and higher-molecular weight polyols and the auxiliary substances and additives either simultaneously or successively, preferably with the exclusion of atmospheric moisture. It may be advantageous to add the inorganic material according to the invention only as the last component to the mixture already containing the other components. For adding the inorganic additives which are the essential constituents according to the invention, it is advisable to use high-speed stirrers, although the additives can generally be incorporated sufficiently homogeneously by means of simply laboratory stirrers.

The mixtures according to the invention are used for the production of polyurethanes and, in particular, hard or rigid polyurethane foams as well as semi-rigid to rigid molded polyurethane foam products which have a compact or dense marginal zone on one or all sides.

The following examples illustrate this invention without restricting it.

EXAMPLE 1

A polyol mixture containing
100 parts by weight of a polyether with a hydroxyl number of 35 which has been obtained by the addition of 87% of propylene oxide and 13% of ethylene oxide to trimethylolpropane,
60 parts by weight of butane-1,4-diol,
1.5 parts by weight of permethylated diethylene triamine as activator and
1.0 part by weight of a commercial polyether polysiloxane stabilizer (stabilizer OS-50 of Goldschmidt, Germany)

is vigorously stirred to form a homogeneous mixture. The mixture begins to separate into two phases within two hours so that it can no longer be processed satisfactorily in a machine for producing polyurethanes, i.e. the polyol mixture cannot be mixed with an organic polyisocyanate in a commercial two-component mixing apparatus. Practically all the butanediol separates out after 48 hours' storage at room temperature.

A small quantity by weight of one of the inorganic materials which has a large surface area (identified hereinafter) is now added to the polyol mixture and homogeneously distributed in it. The polyols of the resulting mixture do not separate and the mixture can be processed satisfactorily to make a polyurethane. In addition, the polyol mixture is now stable in storage for weeks, i.e. it is now one week, at the earliest, before the mixture separates into two phases to the point that satisfactory processing can no longer be insured.

After the inorganic material specified below is added, no separation of the system can be observed after one week's storage at room temperature.

The following inorganic materials are used:
a. 0.5 part by weight of a pyrogenic silicic acid with a specific surface area of $120 m^2/g$; this product is sold by the company Degussa, Frankfurt, Germany under the trade-name "Aerosil R 972".
b. 0.5 part by weight of a chrysotile asbestors with a specific surface area of $150 m^2/g$; this product is sold by Johns Manville, Canada under the trade mark "Quebec Standart Grade 7 RF 1".
c. 0.5 part by weight of a commercial combination of chrysotile asbestos and synthetic silicic acid (specific surface area of the combination: $100 m^2/g$). This product is sold by Grace GmbH, Bad Homburg, Germany under the trade-name "Sylodex 37".

Components (a) (-c) are used separately and not as mixtures.

EXAMPLE 2

A polyol mixture containing
100 parts by weight of a polyether with a hydroxyl number of 56 which had been prepared by the addition of 83% of propylene oxide and 17% of ethylene oxide to trimethylol propane,
60 parts by weight of butane-1,4-diol,
1.0 part by weight of a mixture of equal parts of two commercial polyether polysiloxane stabilizers (stabilizer OS-50 of Goldschmidt, Germany and Surfactant EP 5859 F of Imperial Chemical Industries, Great Britain).
1.5 parts by weight of permethylated diethylene triamine and
10 parts by weight of monofluorotrichloromethane is similar in its mixing properties and behavior when processed in a machine, to the polyol mixture in Example 1.

After the addition of 0.5 part by weight of the mixture of chrysotile asbestos and synthetic silicic acid mentioned in Example 1 (c), separation of the polyol mixture into two phases only begins after 8 days.

Example 3

A polyol mixture similar to that described in Example 1, except that the 60 parts by weight of butane diol are replaced by 45 parts by weight of ethylene glycol, separates into two phases within several hours after having been vigorously mixed.

The addition of 0.5 part by weight of a combination of chrysotile asbestos and synthetic silicic acid described in Example 1 (c), prevents the separation of one or more components of the polyol mixture for at least 4 weeks.

Any other mixture of polyols (1) and (2) may be stabilized against separation from each other as described in the foregoing examples with any of the inorganic stabilizers disclosed as suitable herein.

Although the invention has been described in detail for the purpose of illustration, it is to be understood that such detail is solely for the purpose and that variations can be made therein by those skilled in the art without departing from the spirit and scope of the invention except as it may be limited by the claims.

What is claimed is:

1. A polyol mixture containing:
   a. at least two polyols which are normally incompatible with each other, and
   b. about 0.05 to about 5 percent by weight, based on component (a), of an inert surface-active inorganic material having a specific surface area of 10 to 800 $m^2/g$, which inorganic material is selected from the group consisting of activated charcoal, asbestos, a surface-active silicic acid and a zeolite.

2. The polyol mixture of claim 1 wherein component (a) is a combination of
   1. at least one low-molecular weight polyol with a hydroxyl number about 800 to about 1800, and
   2. at least one higher-molecular weight polyol with hydroxyl number of about 28 to about 84.

3. The polyol mixture of claim 2 wherein the proportion by weight of component (1) to component (2) is between 60:40 and 10:90.

4. The polyol mixture of claim 1 wherein component (b) is a silicic acid agglomerate, a chrysotile asbestos or an inorganic material which corresponds to chrysotile asbestos in its mineral structure.

5. A method for stabilizing a mixture of polyols which normally separates into phases against such separation which comprises including a stabilizing amount of an inert surface-active inorganic material having a specific surface area of 10 to 800 $m^2/g$, which inorganic material is selected from the group consisting of activated charcoal, asbestos, a surface-active silicic acid and a zeolite.

6. The method of claim 5 wherein said inorganic material is added in an amount between about 0.05 and 5.0 wt.% based on the total weight of polyols.

* * * * *